US010144196B2

(12) United States Patent
Nakajima et al.

(10) Patent No.: US 10,144,196 B2
(45) Date of Patent: Dec. 4, 2018

(54) STEEL SHEET FOR HOT PRESSING AND METHOD FOR MANUFACTURING HOT-PRESSED MEMBER USING THE SAME

(75) Inventors: Seiji Nakajima, Chiyoda-ku (JP); Tatsuya Miyoshi, Chiyoda-ku (JP); Hiroki Nakamaru, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/988,915

(22) PCT Filed: Nov. 18, 2011

(86) PCT No.: PCT/JP2011/076636
§ 371 (c)(1),
(2), (4) Date: May 22, 2013

(87) PCT Pub. No.: WO2012/070482
PCT Pub. Date: May 31, 2012

(65) Prior Publication Data
US 2013/0252017 A1  Sep. 26, 2013

(30) Foreign Application Priority Data

| Nov. 25, 2010 | (JP) | 2010-261928 |
| Jan. 5, 2011 | (JP) | 2011-000554 |
| Apr. 18, 2011 | (JP) | 2011-091634 |
| Jul. 26, 2011 | (JP) | 2011-162680 |

(51) Int. Cl.
| B32B 15/18 | (2006.01) |
| B32B 15/01 | (2006.01) |
| C21D 1/18 | (2006.01) |
| C21D 9/00 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/28 | (2006.01) |
| C22C 38/32 | (2006.01) |
| C22C 38/60 | (2006.01) |
| C23C 2/06 | (2006.01) |
| C23C 2/28 | (2006.01) |
| C25D 3/56 | (2006.01) |
| B32B 15/04 | (2006.01) |
| C21D 8/02 | (2006.01) |
| C23C 2/26 | (2006.01) |
| C23C 28/02 | (2006.01) |
| C25D 5/50 | (2006.01) |
| C22C 18/00 | (2006.01) |
| C22C 18/04 | (2006.01) |
| C22C 21/10 | (2006.01) |
| B21D 22/20 | (2006.01) |

(52) U.S. Cl.
CPC ............ *B32B 15/01* (2013.01); *B32B 15/012* (2013.01); *B32B 15/013* (2013.01); *B32B 15/043* (2013.01); *C21D 1/18* (2013.01); *C21D 8/0242* (2013.01); *C21D 9/00* (2013.01); *C21D 9/46* (2013.01); *C22C 18/00* (2013.01); *C22C 18/04* (2013.01); *C22C 21/10* (2013.01); *C22C 38/001* (2013.01); *C22C 38/02* (2013.01); *C22C 38/04* (2013.01); *C22C 38/06* (2013.01); *C22C 38/28* (2013.01); *C22C 38/32* (2013.01); *C22C 38/60* (2013.01); *C23C 2/06* (2013.01); *C23C 2/26* (2013.01); *C23C 2/28* (2013.01); *C23C 28/02* (2013.01); *C25D 3/565* (2013.01); *C25D 5/50* (2013.01); *B21D 22/208* (2013.01); *Y10T 428/12535* (2015.01); *Y10T 428/12799* (2015.01); *Y10T 428/12937* (2015.01)

(58) Field of Classification Search
None
See application file for complete search history.

(56) References Cited

U.S. PATENT DOCUMENTS

| 4,610,937 A | | 9/1986 | Ito et al. | |
| 4,707,415 A | * | 11/1987 | Ikeda et al. | 428/621 |
| 4,775,600 A | | 10/1988 | Adaniya | |
| 4,908,279 A | * | 3/1990 | Yusuke | C25D 5/10 428/659 |
| 5,032,236 A | | 7/1991 | Saitou | |
| 5,575,899 A | * | 11/1996 | Nakakoji | C25D 3/565 205/246 |

(Continued)

FOREIGN PATENT DOCUMENTS

| CN | 101509131 | * | 8/2009 | C09D 5/084 |
| DE | 4019964 | | 1/1991 | |

(Continued)

OTHER PUBLICATIONS

International Search Report for International Application No. PCT/JP2011/076636 dated Dec. 20, 2011.

(Continued)

*Primary Examiner* — Seth Dumbris
(74) *Attorney, Agent, or Firm* — RatnerPrestia

(57) ABSTRACT

A steel sheet for hot pressing that is capable of suppressing formation of scales or ZnO in hot pressing and excellent in oxidation resistance, and a method for manufacturing a hot-pressed member using the steel sheet are provided. The steel sheet for hot pressing includes a base steel sheet and a plating layer that is formed on a surface of the base steel sheet at a coating weight of 10 to 90 g/m$^2$ and contains 10 to 25% by mass of Ni and the balance Zn with inevitable impurities.

8 Claims, No Drawings

(56) References Cited

U.S. PATENT DOCUMENTS

| | | | |
|---|---|---|---|
| 6,878,462 B1* | 4/2005 | Umino | C23C 28/023 |
| | | | 428/141 |
| 7,309,528 B2* | 12/2007 | Clerici | B05D 7/54 |
| | | | 252/388 |
| 2001/0042393 A1 | 11/2001 | Kefferstein et al. | |
| 2004/0166360 A1* | 8/2004 | Imai et al. | 428/658 |
| 2004/0238081 A1* | 12/2004 | Yoshinaga | C21D 8/04 |
| | | | 148/603 |
| 2005/0013722 A1* | 1/2005 | Usami et al. | 420/93 |
| 2009/0252641 A1 | 10/2009 | Hoshi et al. | |
| 2010/0196189 A1 | 8/2010 | Nakagawa et al. | |
| 2012/0164472 A1* | 6/2012 | Kuhn | C21D 1/18 |
| | | | 428/621 |
| 2013/0252017 A1 | 9/2013 | Nakajima | |

FOREIGN PATENT DOCUMENTS

| | | | |
|---|---|---|---|
| EP | 0200007 | | 11/1986 |
| EP | 0952193 | | 10/1999 |
| EP | 1629969 | | 3/2006 |
| EP | 2233610 | | 9/2010 |
| EP | 2644751 | | 10/2013 |
| GB | 1490535 | | 11/1977 |
| JP | H02057697 | * | 2/1990 ............... C25D 5/26 |
| JP | 2003-73774 A | | 3/2003 |
| JP | 2003-129209 A | | 5/2003 |
| JP | 2004-250768 | * | 9/2004 ............. C22C 38/00 |
| JP | 2005-113233 | * | 4/2005 ............. C23C 2/06 |
| JP | 2005-113233 A | | 4/2005 |
| JP | 3663145 | | 4/2005 |
| JP | 2005139485 | * | 6/2005 ............. C22C 38/00 |
| JP | 2007-63578 A | | 3/2007 |
| JP | 2010-90462 A | | 4/2010 |
| JP | 2010-90463 A | | 4/2010 |
| JP | 2010-90464 A | | 4/2010 |
| JP | 2010-121181 A | | 6/2010 |
| JP | 2010-261928 A | | 11/2010 |
| JP | 2011-000554 A | | 1/2011 |
| JP | 2011-091634 A | | 5/2011 |
| JP | 2011-162680 A | | 8/2011 |
| JP | 2012233249 | | 11/2012 |
| RU | 2371516 | | 10/2009 |
| WO | 2012070482 | | 5/2012 |

OTHER PUBLICATIONS

Chinese Office Action dated Apr. 7, 2015 in Chinese Application No. 201180055969.3, including English language translation.
Russian Decision to Grant for Application No. 2013123693/02(034912).
Canadian Office Action for Application No. 2,817,504 dated Jun. 19, 2015.
Australian Office Action for Application No. 2011332940 dated Jun. 5, 2015.
Chinese Office Action dated Sep. 14, 2015 in Chinese Application No. 201180055969.3, including English language translation.
Extended European Search Report for European Application No. 11842845.7-1359 dated Oct. 8, 2015.
Canadian Office Action for Application No. 2,817,504 dated Nov. 30, 2015.
Canadian Office Action dated Feb. 18, 2016 for Canadian Application No. 2,817,504.
Korean Office Action for Korean Application No. 10-2015-7006438, dated Oct. 18, 2016, including Concise Statement of Relevance, 6 pages.
Final Office Action for U.S. Appl. No. 14/382,664, dated Nov. 27, 2017, 28 pages.
Non Final Office Action for U.S. Appl. No. 14/382,664, dated Jun. 18, 2018, 19 pages.

* cited by examiner

STEEL SHEET FOR HOT PRESSING AND METHOD FOR MANUFACTURING HOT-PRESSED MEMBER USING THE SAME

CROSS REFERENCE TO RELATED APPLICATIONS

This application is the U.S. National Phase application of PCT/JP2011/076636, filed Nov. 18, 2011, and claims priority to Japanese Patent Application No. 2010-261928, filed Nov. 25, 2010, Japanese Patent Application No. 2011-000554, filed Jan. 5, 2011, Japanese Patent Application No. 2011-091634, filed Apr. 18, 2011, Japanese Patent Application No. 2011-162680, filed Jul. 26, 2011, the disclosures of each of these applications being incorporated herein by reference in their entireties for all purposes.

FIELD OF THE INVENTION

The present invention relates to a steel sheet for hot pressing suitable for manufacturing members, such as suspension members or body structural members of an automobile, by hot pressing and a method for manufacturing a hot-pressed member using the steel sheet for hot pressing.

BACKGROUND OF THE INVENTION

Conventionally, many members such as suspension members or body structural members of an automobile are manufactured by pressing a steel sheet that has predetermined strength. In recent years, from a viewpoint of global environmental conservation, the weight saving of an automobile body is desired, and efforts are being made to reduce the steel-sheet thickness by increasing steel-sheet strength. However, because the press workability of steel sheet is deteriorated with an increase in the strength of the steel sheet, it is difficult to form the steel sheet into a desired shape in many cases.

Patent Literature 1 discloses a pressing technique called hot pressing. This technique realizes both easy pressing and high strength by quenching a heated steel sheet at the same time when the heated steel sheet is pressed by using a mold formed of a die and a punch. However, in this hot pressing, because the steel sheet is heated to the high temperature of around 950° C. before hot pressing, scales (iron oxide) are formed on the surface of the steel sheet. The scales formed on the surface of the steel sheet are peeled off during hot pressing and hence, the mold is damaged or the surface of the member is damaged after hot pressing. Furthermore, the scales remaining on the surface of the member cause a defect in appearance and a defect in painting adhesion. Accordingly, the scales formed on the surface of the member are usually removed by pickling or shot-blasting. These additional processes make manufacturing processes complicated thus causing deterioration in productivity. Furthermore, the members such as suspension members and body structural members of the automobile also require excellent anti-corrosion characteristics. However, an anti-corrosive coating such as a plating layer is not applied to hot-pressed members manufactured in the above-mentioned processes and hence, the anti corrosion characteristics of the members are extremely insufficient.

In such a background, a hot pressing technique capable of suppressing formation of the scales during heating before hot pressing and improving the anti-corrosion characteristics is required. Therefore, a steel sheet to which the anti-corrosive coating such as the plating layer is applied and a method for hot-pressing a member using the steel sheet are proposed. For example, Patent Literature 2 discloses a manufacturing method for a hot-pressed member having excellent anti-corrosion characteristics. This manufacturing method includes a step of hot-pressing a steel sheet coated with Zn or Zn-based alloy and a step of providing a Zn—Fe-based compound or a Zn—Fe—Al-based compound on the surface of the heated steel sheet.

PATENT LITERATURE

Patent Literature 1: UK Patent No. 1490535
Patent Literature 2: Japanese Patent No. 3663145

SUMMARY OF THE INVENTION

In the hot-pressed member manufactured by the method described in Patent Literature 2, there exists a case that the defect in appearance and the defect in painting adhesion due to the formation of the scales are caused, and the degradation of the anti corrosion characteristics due to the generation of ZnO is caused.

For the foregoing reasons, the present invention provides a steel sheet for hot pressing and a method for manufacturing a hot-pressed member using the steel sheet for hot pressing, wherein the steel sheet is excellent in oxidation resistance and capable of suppressing the formation of the scales and ZnO in hot pressing.

The inventors have acquired knowledge described below as a result of intensive examinations on a steel sheet for hot pressing.

(1) Scales are liable to be formed on a local portion, such as a defective portion of a plating layer, or cracks produced by hot pressing from a portion (starting point of cracks) on which Zn—Fe metallic compound are formed during heating.

(2) Scales or ZnO is liable to be formed on the Zinc-plating layer having a melting point lower than 700° C.

(3) In order to suppress formation of the scales or ZnO, it is effective that the plating layer contains 10 to 25% by mass of Ni having a high melting point and the balance Zn with inevitable impurities.

According to an embodiment of the present invention, there is provided a steel sheet for hot pressing including: a base steel sheet; and a plating layer that is formed on a surface of the base steel sheet at a coating weight of 10 to 90 g/m$^2$ and contains 10 to 25% by mass of Ni and the balance Zn with inevitable impurities.

It is preferable that the steel sheet for hot pressing further includes at least one compound layer selected from the group consisting of Si-containing compound layer, Ti-containing compound layer, Al-containing compound layer, and Zr-containing compound layer, wherein the compound layer is formed on the plating layer.

The base steel sheet, which is a steel sheet before the plating layer is provided and is a base for the plating layer, may have component composition having 0.15 to 0.5% by mass of C, 0.05 to 2.0% by mass of Si, 0.5 to 3% by mass of Mn, 0.1% by mass or less of P, 0.05% by mass or less of S, 0.1% by mass or less of Al, 0.01% by mass or less of N, and the balance Fe with inevitable impurities. It is preferable that the base steel sheet further contains at least one component selected from the group consisting of 0.01 to 1% by mass of Cr, 0.2% by mass or less of Ti, and 0.0005 to 0.08% by mass of B. It is preferable that the base steel sheet further contains, in addition to/separately from the above-mentioned at least one component, 0.003 to 0.03% by mass of Sb.

According to an embodiment of the present invention, there is provided a method for manufacturing a hot-pressed member, the method including: heating the above-mentioned steel sheet for hot pressing to a temperature ranging from $Ac_3$ transformation point to 1000° C.; and hot-pressing the heated steel sheet.

According to the present invention, it is possible to manufacture the steel sheet for hot pressing that is capable of suppressing formation of the scales or ZnO in hot pressing and excellent in oxidation resistance. A hot-pressed member manufactured by a method for manufacturing the hot-pressed member in the present invention with the use of the steel sheet for hot pressing in the present invention is excellent in appearance, and has excellent painting adhesion and anti-corrosion characteristics. Hence, the hot-pressed member is suitable for a suspension member or a body structural member of an automobile.

DETAILED DESCRIPTION OF EMBODIMENTS OF THE INVENTION (1) Steel Sheet for Hot Pressing
(1-1) Plating Layer In an embodiment of the present invention, in order to suppress formation of scales or ZnO in hot pressing, a plating layer containing 10 to 25% by mass of Ni and the balance Zn with inevitable impurities is provided on a surface of a steel sheet. A content of Ni contained in the plating layer is set to 10 to 25% by mass whereby a γ phase having any one crystal structure of $Ni_2Zn_{11}$, $NiZn_3$, or $Ni_5Zn_{21}$ and having a high melting point of 881° C. is formed. Accordingly, in heating, the formation of the scales or ZnO can be minimized. Furthermore, during heating, Zn—Fe-based metallic compound is not formed and hence, the formation of the scales accompanying with production of cracks is suppressed. Furthermore, the plating layer having such composition remains on the steel sheet as the γ phase even after completion of hot pressing thus exhibiting excellent anti-corrosion characteristics by a sacrificial protection effect of Zn. Here, in the case where the content of Ni is 10 to 25% by mass, the formation of the γ phase does not correspond with data in the equilibrium diagram for Ni—Zn alloy. This result may be brought about by the fact that a plating-layer forming reaction that is performed by an electroplating method or the like proceeds in a state of non-equilibrium. The γ phases of $Ni_2Zn_{11}$, $NiZn_3$, or $Ni_5Zn_{21}$ can be confirmed by an electron diffraction method with the use of an X-ray diffraction method or TEM (Transmission Electron Microscopy). Furthermore, although the γ phase is, as described above, formed by setting Ni content contained in the plating layer to 10 to 25% by mass, there exists a case that some quantity of a η phase is also formed depending on the electroplating conditions or the like. In this case, in order to minimize the formation of the scales or ZnO during heating, it is preferable to set an η phase content to 5% by mass or less. The η phase content is defined as the ratio of the weight of the η phase to the total weight of the plating layer. For example, the η phase content can be determined by the anodic dissolution method or the like.

The coating weight of the plating layer is set to 10 to 90 $g/m^2$ for one side. When the coating weight of the plating layer is less than 10 $g/m^2$, the sacrificial protection effect of Zn is not sufficiently exhibited. When the coating weight of the plating layer is more than 90 $g/m^2$, the sacrificial protection effect of Zn becomes saturated thus increasing the cost of manufacturing.

Although a method for forming the plating layer is not particularly limited, it is preferable to use a well-known electroplating method.

At least one compound layer selected from the group consisting of a Si-containing compound layer, a Ti-containing compound layer, an Al-containing compound layer and a Zr-containing compound layer is further provided on the plating layer thus obtaining excellent painting adhesion. In order to obtain such an effect, it is preferable to set a thickness of the compound layer to 0.1 μm or more. Furthermore, it is preferable to set the thickness of the compound layer to 3.0 μm or less. When the thickness of the compound layer exceeds 3.0 μm, the compound layer becomes brittle thus causing the defect in painting adhesion. The thickness of the compound layer is more preferably within the range from 0.4 to 2.0 μm.

As a Si-containing compound, for example, silicone resin, lithium silicate, silicate soda, colloidal silica, and a silane coupling agent are applicable. As a Ti-containing compound, for example, titanate such as lithium titanate or calcium titanate, and a titanium coupling agent containing titanium alkoxide or a chelate-type titanium compound as a base compound are applicable. As an Al-containing compound, for example, aluminate such as sodium aluminate or calcium aluminate, and an aluminum coupling agent containing aluminum alkoxide or a chelate-type aluminum compound as a base compound are applicable. As a Zr-containing compound, for example, zirconate such as lithium zirconate and calcium zirconate, a zirconium coupling agent containing zirconium alkoxide or a chelate-type zirconium compound as a base compound are applicable.

In order to form the above-mentioned compound layer on the plating layer, at least one compound selected from the group consisting of the Si-containing compound, the Ti-containing compound, the Al-containing compound, and the Zr-containing compound may be adhere to the plating layer and thereafter, may be baked without being washed with water. As an adhesion treatment for these compounds, any of an application method, a dipping method, and a spray method may be used. Furthermore, a roll coater, a squeeze coater, a die coater or the like may be used. After performing an application treatment by the squeeze coater, a dipping treatment or spraying treatment, it is also possible to adjust the amount of the compound and uniformize appearance and the thickness of the compound layer with the use of an air knife method or a squeeze roll method. Furthermore, the maximum arriving temperature of the steel sheet when baking may be within the range from 40 to 200° C., and preferably within the range from 60 to 160° C.

Furthermore, the method for forming the above-mentioned compound layer on the plating layer is not limited to the above-mentioned method. It is also possible to form the above-mentioned compound layer on the plating layer by a method described below; for example, a reactive treatment such that the steel sheet having the plating layer is immersed in an acidic aqueous solution containing at least one cation selected from the group consisting of Si, Ti, Al, and Zr and at least one anion selected from the group consisting of phosphoric acid ion, fluorine acid ion, and fluoride ion is performed and thereafter, the steel sheet is baked with being washed with water or without being washed with water.

The above-mentioned compound layer may contain inorganic solid lubricant. By the addition of the inorganic solid lubricant, the coefficient of dynamic friction at the time of hot pressing is reduced thus improving the press workability.

As the inorganic solid lubricant, at least one substance selected from the group consisting of metal sulfide (molybdenum disulfide, tungsten disulfide or the like), a selenium compound (molybdenum selenide, tungsten selenide or the like), graphite, fluoride (graphite fluoride, calcium fluoride or the like), nitride (boron nitride, silicon nitride or the like), borax, mica, metallic tin, and alkali metal sulfate (sodium sulfate, potassium sulfate or the like) is applicable. It is preferable that the content of the above-mentioned inorganic solid lubricant contained in the compound layer is 0.1 to 20% by mass. In the case where the content of the inorganic solid lubricant is 0.1% by mass or more, the compound layer is capable of providing a lubrication effect. In the case where the content of the inorganic solid lubricant is 20% by mass or less, the painting adhesion is not degraded.

(1-2) Base Steel Sheet

In order to obtain the hot-pressed member having tensile strength (TS) of 980 MPa or more, as a base steel sheet before plating, for example, a hot-rolled steel sheet or a cold-rolled steel sheet including component composition having 0.15 to 0.5% by mass of C, 0.05 to 2.0% by mass of Si, 0.5 to 3% by mass of Mn, 0.1% by mass or less of P, 0.05% by mass or less of S, 0.1% by mass or less of Al, 0.01% by mass or less of N, and the balance Fe with inevitable impurities may be used. The reason that the content of each component element is limited is explained hereinafter. Here, "%" expressing the content of the component means "% by mass" unless otherwise specified.

C: 0.15 to 0.5%

The component element C is an element that improves the strength of steel. In order to increase the tensile strength of the hot-pressed member to 980 MPa or higher, it is necessary to set the content of C to 0.15% or more. On the other hand, in the case that the content of C exceeds 0.5%, blanking workability of the steel sheet as a raw material is remarkably deteriorated. Therefore, the content of C is within the range from 0.15 to 0.5%.

Si: 0.05 to 2.0%

The component element Si is an element that improves the strength of steel in the same manner as the case of C. In order to increase the tensile strength of the hot-pressed member to 980 MPa or higher, it is necessary to set the content of Si to 0.05% or more. On the other hand, in the case that the content of Si exceeds 2.0%, generation of a surface defect called red scale is extremely increased and, at the same time, a rolling load is increased or ductility of the hot-rolled steel sheet is deteriorated. Furthermore, in performing a plating treatment such that the plating film containing Zn or Al as a main component is formed on the surface of the steel sheet, there exists a case that the Si content that exceeds 2.0% adversely affects plating processability. Therefore, the content of Si is within the range from 0.05 to 2.0%.

Mn: 0.5 to 3%

The component element Mn is an element effective for improving hardenability by suppressing ferrite transformation, and also effective for lowering heating temperature before hot pressing by lowering $Ac_3$ transformation point. In order to exhibit such effects, it is necessary to set the content of Mn to 0.5% or more. On the other hand, in the case that the content of Mn exceeds 3%, Mn is segregated, and uniformity of characteristics of the steel sheet as the raw material and the hot-pressed member is lowered. Therefore, the content of Mn is within the range from 0.5 to 3%.

P: 0.1% or less

When the content of P exceeds 0.1%, P is segregated, and uniformity of characteristics of the steel sheet as the raw material and the hot-pressed member is lowered and, at the same time, toughness thereof is also lowered. Therefore, the content of P is set to 0.1% or less.

S: 0.05% or Less

When the content of S exceeds 0.05%, toughness of the hot-pressed member is lowered. Therefore, the content of S is set to 0.05% or less.

Al: 0.1% or Less

When the content of Al exceeds 0.1%, blanking workability or hardenability of the steel sheet as a raw material is deteriorated. Therefore, the content of Al is set to 0.1% or less.

N: 0.01% or Less

When the content of N exceeds 0.01%, the nitride such as AlN is formed during hot-rolling or heating before hot pressing, and blanking workability or hardenability of the steel sheet as a raw material is deteriorated. Therefore, the content of N is set to 0.01% or less.

The balance of the above-mentioned component contained in the base steel sheet is constituted of Fe with the inevitable impurities. However, due to the following grounds, it is preferable that at least one component selected from the group consisting of 0.01 to 1% Cr, 0.2% or less Ti, and 0.0005 to 0.08% B, and/or 0.003 to 0.03% Sb are contained in the balance.

Cr: 0.01 to 1%

The component element Cr is effective for strengthening the steel and improving hardenability of the steel. In order to exhibit such effects, it is preferable to set the content of Cr to 0.01% or more. On the other hand, in the case that the content of Cr exceeds 1%, the manufacturing cost for the base steel sheet is considerably increased. Therefore, it is preferable that the content of Cr is set to 1% maximum.

Ti: 0.2% or Less

The component element Ti is effective for strengthening the steel and improving toughness of the steel by refining crystalline grains. Furthermore, the component element Ti is also effective for forming nitride in priority to the component element B mentioned below and exhibiting the effect of improving hardenability by solid-solved component element B. However, in the case that the content of Ti exceeds 0.2%, a rolling load is extremely increased during hot-rolling and the toughness of the hot-pressed member is lowered. Therefore, it is preferable that the content of Ti is set to 0.2% maximum.

B: 0.0005 to 0.08%

The component element B is effective for improving hardenability in hot pressing and toughness after hot pressing. In order to exhibit such effects, it is preferable to set the content of B to 0.0005% or more. On the other hand, in the case that the content of B exceeds 0.08%, the rolling load is extremely increased during hot-rolling and cracks or the like in the steel sheet is produced due to martensitic phases or bainitic phases formed after hot-rolling. Therefore, it is preferable that the content of B is set to 0.08% maximum.

Sb: 0.003 to 0.03%

The component element Sb is effective for suppressing a decarburized layer formed in the surface layer part of the steel sheet while cooling the steel sheet in performing a series of processes from the process of heating the steel sheet before hot pressing to the process of hot pressing. In order to exhibit such an effect, it is necessary to set the content of Sb to 0.003% or more. On the other hand, in the case that the content of Sb exceeds 0.03%, a rolling load is extremely increased during hot-rolling thus decreasing productivity. Therefore, it is preferable that the content of Sb is within the range from 0.003 to 0.03%.

(2) Method for Manufacturing Hot-Pressed Member

The above-mentioned steel sheet for hot pressing is hot-pressed after being heated to a temperature ranging from $Ac_3$ transformation point to 1000° C., thus forming the hot-pressed member. The steel sheet is heated to the temperature equal to or higher than $Ac_3$ transformation point for forming a hard phase such as a martensitic phase or the like by quenching in hot pressing to increase the strength of the member. Furthermore, the heating temperature is 1000° C. maximum, because a large amount of ZnO is formed on the surface of the plating layer when the heating temperature exceeds 1000° C. Here, the heating temperature means the maximum arriving temperature of the steel sheet.

Although the average temperature-rising rate upon heating before hot pressing is not limited particularly to a certain rate, for example, the average temperature-rising rate ranging from 2 to 200° C./s is preferable. The amount of ZnO formed on the surface of the plating layer and the amount of scales locally formed on defective portions of the plating layer are increased along with the increase of the high temperature residence time for which the steel sheet is exposed to a high temperature. Therefore, it is preferable to increase the average temperature-rising rate because the formation of scales is suppressed. Furthermore, although the holding time at the maximum arriving temperature of the steel sheet is also not limited particularly to the certain time, for the reason same as above, it is preferable to shorten the holding time. The holding time is preferably set to 300 seconds or shorter, more preferably to 120 seconds or shorter, and further preferably to 10 seconds or shorter.

As a heating method before hot pressing, a heating method with the use of an electric furnace or a gas furnace, a flame heating method, a conduction heating method, a high frequency induction heating method, an induction heating method or the like can be illustrated.

First Example

As a base steel sheet, cold-rolled steel sheets including component composition having 0.23% by mass of C, 0.25% by mass of Si, 1.2% by mass of Mn, 0.01% by mass of P, 0.01% by mass of S, 0.03% by mass of Al, 0.005% by mass of N, 0.2% by mass of Cr, 0.02% by mass of Ti, 0.0022% by mass of B, 0.008% by mass of Sb, and the balance Fe with inevitable impurities, and having $Ac_3$ transformation point of 820° C. and the thickness of 1.6 mm were used. The electroplating treatment was applied to the surfaces of the cold-rolled steel sheets by changing current density from 5 to 100 A/dm² in a plating bath with pH 1.5 and 50° C. temperature solution containing 200 g/L of nickel sulfate hexahydrate and 10 to 100 g/L of zinc sulfate heptahydrate. As illustrated in Tables 1 to 3, steel sheets Nos. 1 to 19 having plating layers that are different in Ni content (the balance is Zn with inevitable impurities), coating weight, and η-phase content were prepared. Furthermore, for comparison with the steel sheets Nos. 1 to 19, steel sheets Nos. 20 to 24 of a hot dip galvanized steel sheet (GI), a galvannealed steel sheet (GA), a hot dip Zn-5% Al plated steel sheet (GF), and a hot dip Zn-55% Al plated steel sheet (GL) that were made by applying hot-dip plating to the above-mentioned cold-rolled steel sheets, and a cold-rolled steel sheet with no plating layer were prepared. Tables 1 to 4 shows the thus prepared steel sheets Nos. 1 to 24.

Each of the steel sheets Nos. 1 to 24 was heated in the electric furnace or by direct energization under the heating condition specified in Tables 1 to 4 and, thereafter, cooled at 50° C./s cooling rate in a state that each steel sheet was sandwiched between dies made of aluminum. Next, oxidation resistance described below was evaluated. Tables 1 to 4 lists compositions of the plating layers, heating conditions, and evaluation results of the oxidation resistance for each steel sheet.

Oxidation resistance: Each steel sheet was heated under the heating condition illustrated in Tables 1 to 4 and, thereafter, the weight of each steel sheet was measured and the change in weight was measured by comparing the weight after heating to the weight before heating. Here, the change in weight is obtained by adding the weight increased by the formation of the scales or ZnO and the weight reduced by the scattering of ZnO formed. The oxidation resistance is enhanced along with the reduction of the absolute value of the change in weight. The oxidation resistance was evaluated on the basis of the following criteria. When the result of the evaluation is "Excellent" or "Good", the benefit of the present invention is achieved.

Excellent: the absolute value of the change in weight≤3 g/m²

Good: 3 g/m²<the absolute value of the change in weight≤5 g/m²

Poor: 5 g/m²<the absolute value of the change in weight

As illustrated in Tables 1 to 4, it is evident that the steel sheets Nos. 1 to 16 have small absolute values of the change in weight and are excellent in oxidation resistance.

TABLE 1

| Steel sheet No. | Plating layer | | | | Heating conditions | | | Oxidation resistance | | | Remarks |
|---|---|---|---|---|---|---|---|---|---|---|---|
| | Kind of component | Ni content (mass %) | Coating weight (g/m²) | η-phase content (mass %) | Average temperature-rising rate (° C./s) | Heating temperature (° C.) | Holding time (s) | Change in weight (g/m²) | Judgment | Oxidation appearance | |
| 1 | Zn—Ni | 12 | 45 | 0 | 30 | 900 | 0 | +1.5 | Excellent | | Present-invention example |
| 2 | Zn—Ni | 10 | 45 | 1 | 30 | 900 | 0 | +4.0 | Good | | Present-invention example |
| 3 | Zn—Ni | 18 | 45 | 0 | 30 | 900 | 0 | +2.0 | Excellent | | Present-invention example |
| 4 | Zn—Ni | 25 | 45 | 0 | 30 | 900 | 0 | +3.5 | Good | | Present-invention example |

TABLE 1-continued

| | Plating layer | | | | Heating conditions | | | Oxidation resistance | | | |
|---|---|---|---|---|---|---|---|---|---|---|---|
| Steel sheet No. | Kind of component | Ni content (mass %) | Coating weight (g/m$^2$) | η-phase content (mass %) | Average temperature-rising rate (° C./s) | Heating temperature (° C.) | Holding time (s) | Change in weight (g/m$^2$) | Judgment | Oxidation appearance | Remarks |
| 5 | Zn—Ni | 12 | 10 | 0 | 30 | 900 | 0 | +4.5 | Good | | Present-invention example |
| 6 | Zn—Ni | 12 | 30 | 0 | 30 | 900 | 0 | +2.5 | Excellent | | Present-invention example |
| 7 | Zn—Ni | 12 | 60 | 0 | 30 | 900 | 0 | +1.0 | Excellent | | Present-invention example |
| 8 | Zn—Ni | 12 | 90 | 0 | 30 | 900 | 0 | +0.5 | Excellent | | Present-invention example |
| 9 | Zn—Ni | 12 | 45 | 0 | 3 | 900 | 0 | +4.0 | Good | | Present-invention example |

TABLE 2

| | Plating layer | | | | Heating conditions | | | Oxidation resistance | | | |
|---|---|---|---|---|---|---|---|---|---|---|---|
| Steel sheet No. | Kind of component | Ni content (mass %) | Coating weight (g/m$^2$) | η-phase content (mass %) | Average temperature-rising rate (° C./s) | Heating temperature (° C.) | Holding time (s) | Change in weight (g/m$^2$) | Judgment | Oxidation appearance | Remarks |
| 10 | Zn—Ni | 12 | 45 | 0 | 10 | 900 | 0 | +2.0 | Excellent | | Present-invention example |
| 11 | Zn—Ni | 12 | 45 | 0 | 100 | 900 | 0 | +1.0 | Excellent | | Present-invention example |
| 12 | Zn—Ni | 12 | 45 | 0 | 30 | 850 | 0 | +0.5 | Excellent | | Present-invention example |
| 13 | Zn—Ni | 12 | 45 | 0 | 30 | 950 | 0 | +2.5 | Excellent | | Present-invention example |
| 14 | Zn—Ni | 12 | 45 | 0 | 30 | 1000 | 0 | +4.5 | Good | | Present-invention example |
| 15 | Zn—Ni | 12 | 45 | 0 | 30 | 900 | 120 | +2.5 | Excellent | | Present-invention example |
| 16 | Zn—Ni | 12 | 45 | 0 | 30 | 900 | 300 | +4.0 | Good | | Present-invention example |
| 17 | Zn—Ni | 9 | 45 | 6 | 30 | 900 | 0 | +8.5 | Poor | A large amount of ZnO formed | Comparative example |

TABLE 3

| Steel sheet No. | Plating layer | | | | Heating conditions | | | Oxidation resistance | | | Remarks |
|---|---|---|---|---|---|---|---|---|---|---|---|
| | Kind of component | Ni content (mass %) | Coating weight (g/m²) | η-phase content (mass %) | Average temperature-rising rate (° C./s) | Heating temperature (° C.) | Holding time (s) | Change in weight (g/m²) | Judgment | Oxidation appearance | |
| 18 | Zn—Ni | 26 | 45 | 0 | 30 | 900 | 0 | +6.0 | Poor | A large amount of ZnO formed | Comparative example |
| 19 | Zn—Ni | 12 | 9 | 0 | 30 | 900 | 0 | +7.5 | Poor | A large amount of scale formed | Comparative example |
| 20 | GI | — | 45 | — | 30 | 900 | 0 | +9.0 | Poor | A large amount of ZnO formed | Comparative example |
| 21 | GA | — | 45 | — | 30 | 900 | 0 | +7.0 | Poor | A large amount of ZnO formed | Comparative example |
| 22 | GF | — | 45 | — | 30 | 900 | 0 | +8.5 | Poor | A large amount of ZnO formed | Comparative example |

TABLE 4

| Steel sheet No. | Plating layer | | | | Heating conditions | | | Oxidation resistance | | | Remarks |
|---|---|---|---|---|---|---|---|---|---|---|---|
| | Kind of component | Ni content (mass %) | Coating weight (g/m²) | η-phase content (mass %) | Average temperature-rising rate (° C./s) | Heating temperature (° C.) | Holding time (s) | Change in weight (g/m²) | Judgment | Oxidation appearance | |
| 23 | GL | — | 45 | — | 30 | 900 | 0 | −13.5 | Poor | A large amount of ZnO formed and scattered | Comparative example |
| 24 | NONE | — | — | — | 30 | 900 | 0 | +35.0 | Poor | A large amount of scale formed | Comparative example |

The above-mentioned steel sheets were not actually worked by hot press. However, as mentioned above, because the oxidation resistance is influenced by the change in plating layer due to the heating before hot pressing, particularly by the behavior of Zn contained in the plating layer, the oxidation resistance of the hot-pressed member can be evaluated by the results of these examples.

Second Example

The plating layers that were different in Ni content, coating weight, and η-phase content were formed on the surfaces of the base steel sheets same as that of First Example in the same manner as the case of First Example. Thereafter, a composite (solid content ratio of 15% by mass) having at least one compound selected from the group consisting of a Si-containing compound, a Ti-containing compound, an Al-containing compound, a Zr-containing compound, and a Si and Zr-containing compound that are described below, and the balance solvent was applied to the plating layers. Thereafter, the steel sheets were baked under the condition that the maximum arriving temperature of the steel sheet was 140° C. and, as illustrated in Tables 5 to 15, any of a Si-containing compound layer, a Ti-containing compound layer, an Al-containing compound layer, a Zr-containing compound layer, and a Si and Zr-containing compound layer that were different in thickness was formed thus preparing the steel sheets Nos. 1 to 32. Tables 5 to 15 show the steel sheets Nos. 1 to 32 thus prepared.

Here, as the Si-containing compound, the Ti-containing compound, the Al-containing compound, and the Zr-containing compound, the following compounds were used.

Silicone resin: KR-242A manufactured by Shin-Etsu Chemical Co., Ltd.

Lithium silicate: lithium silicate 45 manufactured by Nissan Chemical Industries, Ltd.

Colloidal silica: SNOWTEX OS manufactured by Nissan Chemical Industries, Ltd.

Silane coupling agent: KBE-403 manufactured by Shin-Etsu Chemical Co., Ltd.

Titanium coupling agent: ORGATIX TA-22 manufactured by Matsumoto Fine Chemical Co., Ltd.

Lithium titanate: lithium titanate manufactured by Titan Kogyo, Ltd.

Sodium aluminate: NA-170 manufactured by Asahi Chemical Co., Ltd.

Aluminum coupling agent: PLENACT AL-M manufactured by Ajinomoto Fine-Techno Co., Inc.

Zirconium acetate: Zirconium acetate manufactured by SANEI KAKO Co., Ltd.

Zirconium coupling agent: ORGATIX ZA-65 manufactured by Matsumoto Fine Chemical Co., Ltd.

Furthermore, a solvent used when the silicone resin was used as a compound was the thinner mixed of ethylene glycol monobutyl ether and naphtha in the mass ratio of 55/45. Furthermore, a solvent used when a substance other than the silicone resin was used as a compound was the deionized water.

The steel sheets Nos. 1 to 32 obtained in such a manner and illustrated in Tables 5 to 15 have the plating layers and the compound layers formed on the surface thereof in the order given above. Each steel sheet was heated in the electric furnace or by direct energization under the heating condition specified in Tables 5 to 15 and, thereafter, cooled at 50° C./s cooling rate in a state that each steel sheet was sandwiched between dies made of aluminum. Thereafter, oxidation resistance same as the case of First Example and painting adhesion described below were evaluated. Tables 5 to 15 list the composition of the plating layer, the composition of the compound layer, the heating condition, and evaluation results of the oxidation resistance and painting adhesion for each steel sheet.

Painting adhesion: Samples were taken from the steel sheets after heat treatment and a chemical conversion treatment was applied to each sample under the standard condition with the use of PB-SX35 manufactured by Nihon Parkerizing Co., Ltd. Thereafter, a coating film having a thickness of 20 μm was formed on the surface of the sample by electrodeposition coating under the baking condition of at 170° C. for 20 minutes with the use of the electrodeposition paint GT-10HT Gray manufactured by Kansai Paint Co., Ltd. for preparing a test piece. Next, cuts penetrating to the surface of the base steel sheet were made on the prepared test-piece surface to which the chemical conversion treatment and the electrodeposition coating were applied in a lattice pattern (10 by 10 squares, 1 mm intervals) by using a cutter knife, and a cross cut tape peel test for testing the painting adhesion by sticking and peeling an adhesive tape was performed. The painting adhesion was evaluated on the basis of the following criteria. When the result of the evaluation is "Excellent" or "Good", the sample is excellent in painting adhesion.

Excellent: No peeling
Good: Peeled in 1 to 10 squares
Fair: Peeled in 11 to 30 squares
Poor: Peeled in 31 squares or more As illustrated in Tables 5 to 15, in the examples of the present invention, it is evident that the steel sheet provided with the compound layer is excellent in painting adhesion as well as in oxidation resistance.

TABLE 5

| Steel sheet No. | Plating layer | | | | Si(Ti, Al, Zr)-containing compound layer | | Heating conditions | | | Oxidation resistance | | Painting adhesion | Remarks |
|---|---|---|---|---|---|---|---|---|---|---|---|---|---|
| | Kind of component | Ni content (mass %) | Coating weight (g/m$^2$) | η-phase content (mass %) | compound | Thickness (μm) | Average temperature-rising rate (° C./s) | Heating temperature (° C.) | Holding time (s) | Change in weight (g/m$^2$) | Judgment | | |
| 1 | Zn—Ni | 12 | 45 | 0 | Silicone resin | 0.5 | 30 | 900 | 0 | +0.4 | Excellent | Excellent | Present-invention example |
| 2 | Zn—Ni | 12 | 45 | 0 | Lithium silicate | 0.5 | 30 | 900 | 0 | +0.7 | Excellent | Excellent | Present-invention example |
| 3 | Zn—Ni | 12 | 45 | 0 | Colloidal silica | 0.5 | 30 | 900 | 0 | +0.9 | Excellent | Excellent | Present-invention example |

TABLE 6

| Steel sheet No. | Plating layer | | | | Si(Ti, Al, Zr)-containing compound layer | | Heating conditions | | | Oxidation resistance | | Painting adhesion | Remarks |
|---|---|---|---|---|---|---|---|---|---|---|---|---|---|
| | Kind of component | Ni content (mass %) | Coating weight (g/m$^2$) | η-phase content (mass %) | compound | Thickness (μm) | Average temperature-rising rate (° C./s) | Heating temperature (° C.) | Holding time (s) | Change in weight (g/m$^2$) | Judgment | | |
| 4 | Zn—Ni | 12 | 45 | 0 | Silane coupling agent | 0.5 | 30 | 900 | 0 | +0.5 | Excellent | Excellent | Present-invention example |
| 5 | Zn—Ni | 12 | 45 | 0 | Titanium coupling agent | 0.5 | 30 | 900 | 0 | +0.7 | Excellent | Excellent | Present-invention example |
| 6 | Zn—Ni | 12 | 45 | 0 | Lithium titanate | 0.5 | 30 | 900 | 0 | +0.8 | Excellent | Excellent | Present-invention example |

TABLE 7

| Steel sheet No. | Plating layer Kind of component | Ni content (mass %) | Coating weight (g/m²) | η-phase content (mass %) | Si(Ti, Al, Zr)-containing compound layer compound | Thickness (μm) | Heating conditions Average temperature-rising rate (° C./s) | Heating temperature (° C.) | Holding time (s) | Oxidation resistance Change in weight (g/m²) | Judgment | Painting adhesion | Remarks |
|---|---|---|---|---|---|---|---|---|---|---|---|---|---|
| 7 | Zn—Ni | 12 | 45 | 0 | Sodium aluminate | 0.5 | 30 | 900 | 0 | +0.8 | Excellent | Excellent | Present-invention example |
| 8 | Zn—Ni | 12 | 45 | 0 | Aluminum coupling agent | 0.5 | 30 | 900 | 0 | +0.9 | Excellent | Excellent | Present-invention example |
| 9 | Zn—Ni | 12 | 45 | 0 | Zirconium acetate | 0.5 | 30 | 900 | 0 | +0.6 | Excellent | Excellent | Present-invention example |

TABLE 8

| Steel sheet No. | Plating layer Kind of component | Ni content (mass %) | Coating weight (g/m²) | η-phase content (mass %) | Si(Ti, Al, Zr)-containing compound layer compound | Thickness (μm) | Heating conditions Average temperature-rising rate (° C./s) | Heating temperature (° C.) | Holding time (s) | Oxidation resistance Change in weight (g/m²) | Judgment | Painting adhesion | Remarks |
|---|---|---|---|---|---|---|---|---|---|---|---|---|---|
| 10 | Zn—Ni | 12 | 45 | 0 | Zirconium coupling agent | 0.5 | 30 | 900 | 0 | +0.6 | Excellent | Excellent | Present-invention example |
| 11 | Zn—Ni | 12 | 45 | 0 | Silane coupling agent + zirconium coupling agent | 0.5 | 30 | 900 | 0 | +0.4 | Excellent | Excellent | Present-invention example |
| 12 | Zn—Ni | 12 | 45 | 0 | — | — | 30 | 900 | 0 | +1.5 | Excellent | Fair | Present-invention example |

TABLE 9

| Steel sheet No. | Plating layer Kind of component | Ni content (mass %) | Coating weight (g/m²) | η-phase content (mass %) | Si(Ti, Al, Zr)-containing compound layer compound | Thickness (μm) | Heating conditions Average temperature-rising rate (° C./s) | Heating temperature (° C.) | Holding time (s) | Oxidation resistance Change in weight (g/m²) | Judgment | Painting adhesion | Remarks |
|---|---|---|---|---|---|---|---|---|---|---|---|---|---|
| 13 | Zn—Ni | 12 | 45 | 0 | Silicone resin | 0.1 | 30 | 900 | 0 | +1.2 | Excellent | Good | Present-invention example |
| 14 | Zn—Ni | 12 | 45 | 0 | Silicone resin | 0.4 | 30 | 900 | 0 | +0.8 | Excellent | Excellent | Present-invention example |
| 15 | Zn—Ni | 12 | 45 | 0 | Silicone resin | 2.0 | 30 | 900 | 0 | +0.4 | Excellent | Excellent | Present-invention example |

TABLE 10

| Steel sheet No. | Plating layer | | | | Si(Ti, Al, Zr)-containing compound layer | | Heating conditions | | | Oxidation resistance | | Painting adhesion | Remarks |
|---|---|---|---|---|---|---|---|---|---|---|---|---|---|
| | Kind of component | Ni content (mass %) | Coating weight (g/m$^2$) | η-phase content (mass %) | compound | Thickness (μm) | Average temperature-rising rate (° C./s) | Heating temperature (° C.) | Holding time (s) | Change in weight (g/m$^2$) | Judgment | | |
| 16 | Zn—Ni | 12 | 45 | 0 | Silicone resin | 3.0 | 30 | 900 | 0 | +0.3 | Excellent | Good | Present-invention example |
| 17 | Zn—Ni | 12 | 45 | 0 | Silicone resin | 4.0 | 30 | 900 | 0 | +1.0 | Excellent | Good | Present-invention example |

TABLE 11

| Steel sheet No. | Plating layer | | | | Si(Ti, Al, Zr)-containing compound layer | | Heating conditions | | | Oxidation resistance | | Painting adhesion | Remarks |
|---|---|---|---|---|---|---|---|---|---|---|---|---|---|
| | Kind of component | Ni content (mass %) | Coating weight (g/m$^2$) | η-phase content (mass %) | compound | Thickness (μm) | Average temperature-rising rate (° C./s) | Heating temperature (° C.) | Holding time (s) | Change in weight (g/m$^2$) | Judgment | | |
| 18 | Zn—Ni | 10 | 45 | 1 | Silicone resin | 0.5 | 30 | 900 | 0 | +0.6 | Excellent | Good | Present-invention example |
| 19 | Zn—Ni | 18 | 45 | 0 | Silicone resin | 0.5 | 30 | 900 | 0 | +0.4 | Excellent | Excellent | Present-invention example |
| 20 | Zn—Ni | 25 | 45 | 0 | Silicone resin | 0.5 | 30 | 900 | 0 | +0.3 | Excellent | Excellent | Present-invention example |

TABLE 12

| Steel sheet No. | Plating layer | | | | Si(Ti, Al, Zr)-containing compound layer | | Heating conditions | | | Oxidation resistance | | Painting adhesion | Remarks |
|---|---|---|---|---|---|---|---|---|---|---|---|---|---|
| | Kind of component | Ni content (mass %) | Coating weight (g/m$^2$) | η-phase content (mass %) | compound | Thickness (μm) | Average temperature-rising rate (° C./s) | Heating temperature (° C.) | Holding time (s) | Change in weight (g/m$^2$) | Judgment | | |
| 21 | Zn—Ni | 12 | 10 | 0 | Silicone resin | 0.5 | 30 | 900 | 0 | +0.8 | Excellent | Good | Present-invention example |
| 22 | Zn—Ni | 2 | 30 | 0 | Silicone resin | 0.5 | 30 | 900 | 0 | +0.6 | Excellent | Excellent | Present-invention example |
| 23 | Zn—Ni | 12 | 60 | 0 | Silicone resin | 0.5 | 30 | 900 | 0 | +0.3 | Excellent | Excellent | Present-invention example |

TABLE 13

| Steel sheet No. | Plating layer Kind of component | Plating layer Ni content (mass %) | Plating layer Coating weight (g/m²) | Plating layer η-phase content (mass %) | Si(Ti, Al, Zr)-containing compound layer compound | Si(Ti, Al, Zr)-containing compound layer Thickness (μm) | Heating conditions Average temperature-rising rate (° C./s) | Heating conditions Heating temperature (° C.) | Heating conditions Holding time (s) | Oxidation resistance Change in weight (g/m²) | Oxidation resistance Judgment | Painting adhesion | Remarks |
|---|---|---|---|---|---|---|---|---|---|---|---|---|---|
| 24 | Zn—Ni | 12 | 90 | 0 | Silicone resin | 0.5 | 30 | 900 | 0 | +0.2 | Excellent | Excellent | Present-invention example |
| 25 | Zn—Ni | 12 | 45 | 0 | Silicone resin | 0.5 | 3 | 900 | 0 | +0.9 | Excellent | Excellent | Present-invention example |
| 26 | Zn—Ni | 12 | 45 | 0 | Silicone resin | 0.5 | 10 | 900 | 0 | +0.7 | Excellent | Excellent | Present-invention example |

TABLE 14

| Steel sheet No. | Plating layer Kind of component | Plating layer Ni content (mass %) | Plating layer Coating weight (g/m²) | Plating layer η-phase content (mass %) | Si(Ti, Al, Zr)-containing compound layer compound | Si(Ti, Al, Zr)-containing compound layer Thickness (μm) | Heating conditions Average temperature-rising rate (° C./s) | Heating conditions Heating temperature (° C.) | Heating conditions Holding time (s) | Oxidation resistance Change in weight (g/m²) | Oxidation resistance Judgment | Painting adhesion | Remarks |
|---|---|---|---|---|---|---|---|---|---|---|---|---|---|
| 27 | Zn—Ni | 12 | 45 | 0 | Silicone resin | 0.5 | 100 | 900 | 0 | +0.3 | Excellent | Good | Present-invention example |
| 28 | Zn—Ni | 12 | 45 | 0 | Silicone resin | 0.5 | 30 | 850 | 0 | +0.3 | Excellent | Excellent | Present-invention example |
| 29 | Zn—Ni | 12 | 45 | 0 | Silicone resin | 0.5 | 30 | 950 | 0 | +0.8 | Excellent | Excellent | Present-invention example |

TABLE 15

| Steel sheet No. | Plating layer Kind of component | Plating layer Ni content (mass %) | Plating layer Coating weight (g/m²) | Plating layer η-phase content (mass %) | Si(Ti, Al, Zr)-containing compound layer compound | Si(Ti, Al, Zr)-containing compound layer Thickness (μm) | Heating conditions Average temperature-rising rate (° C./s) | Heating conditions Heating temperature (° C.) | Heating conditions Holding time (s) | Oxidation resistance Change in weight (g/m²) | Oxidation resistance Judgment | Painting adhesion | Remarks |
|---|---|---|---|---|---|---|---|---|---|---|---|---|---|
| 30 | Zn—Ni | 12 | 45 | 0 | Silicone resin | 0.5 | 30 | 1000 | 0 | +1.0 | Excellent | Excellent | Present-invention example |
| 31 | Zn—Ni | 12 | 45 | 0 | Silicone resin | 0.5 | 30 | 900 | 120 | +0.6 | Excellent | Excellent | Present-invention example |
| 32 | Zn—Ni | 12 | 45 | 0 | Silicone resin | 0.5 | 30 | 900 | 300 | +1.0 | Excellent | Excellent | Present-invention example |

In this example, each steel sheet was not actually worked by hot press. However, in the same manner as the case of oxidation resistance, the painting adhesion of the hot-pressed member can be evaluated by the results of this example.

The present invention is applicable to members such as suspension members or body structural members of an automobile manufactured by hot pressing.

The invention claimed is:

1. A steel sheet for hot pressing comprising:
a base steel sheet; and
a plating layer that is formed on a surface of the base steel sheet having a weight of 45 to 90 g/m² and contains 10 to 25% by mass of Ni and the balance Zn with inevitable impurities, the plating layer not including a ZnO layer formed thereon; and a compound layer formed directly on the plating layer, the compound layer including at least one of silicone resin, lithium silicate, lithium titanate, sodium aluminate, and an aluminum coupling agent, wherein a content of η phase contained in the plating layer is 5% by mass or less, the base steel sheet has component composition having 0.15 to 0.5% by mass of C, 0.05 to 2.0% by mass of Si, 0.5 to 3% by mass of Mn, 0.1% by mass or less of P, 0.05% by mass or less of S, 0.1% by mass or less of Al, 0.01% by mass or less of N, 0.008 to 0.03% by mass of Sb, and the balance Fe with inevitable impurities.

2. The steel sheet for hot pressing according to claim 1, wherein the compound layer further contains Zr.

3. The steel sheet for hot pressing according to claim 1, wherein the base steel sheet further contains at least one component selected from the group consisting of 0.01 to 1% by mass of Cr, 0.2% by mass or less of Ti, and 0.0005 to 0.08% by mass of B.

4. The steel sheet for hot pressing according to claim 2, wherein the base steel sheet further contains at least one component selected from the group consisting of 0.01 to 1% by mass of Cr, 0.2% by mass or less of Ti, and 0.0005 to 0.08% by mass of B.

5. A method for manufacturing a hot-pressed member, the method comprising:
heating the steel sheet for hot pressing according to claim 1 to a temperature ranging from $Ac_3$ transformation point to 1000° C.; and
hot-pressing the heated steel sheet.

6. A method for manufacturing a hot-pressed member, the method comprising:
heating the steel sheet for hot pressing according to claim 2 to a temperature ranging from $Ac_3$ transformation point to 1000° C.; and
hot-pressing the heated steel sheet.

7. A method for manufacturing a hot-pressed member, the method comprising;
heating the steel sheet for hot pressing according to claim 3 to a temperature ranging from $Ac_3$ transformation point to 1000° C.; and
hot-pressing the heated steel sheet.

8. A method for manufacturing a hot-pressed member, the method comprising:
heating the steel sheet for hot pressing according to claim to a temperature ranging, from $Ac_3$ transformation point to 1000° C.; and
hot-pressing the heated steel sheet.

\* \* \* \* \*